United States Patent
Goto et al.

(10) Patent No.: US 8,297,426 B2
(45) Date of Patent: Oct. 30, 2012

(54) PISTON APPARATUS OF AUTOMATIC TRANSMISSION

(75) Inventors: Shintaro Goto, Nissin (JP); Hirofumi Morishita, Seto (JP); Naoki Kato, Togo-cho (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 364 days.

(21) Appl. No.: 12/588,539

(22) Filed: Oct. 19, 2009

(65) Prior Publication Data

US 2010/0140038 A1    Jun. 10, 2010

(30) Foreign Application Priority Data

Dec. 8, 2008    (JP) ................................. 2008-312618

(51) Int. Cl.
  F16D 25/0638    (2006.01)
  F16D 25/12      (2006.01)
(52) U.S. Cl. ................................. 192/85.24; 192/48.611
(58) Field of Classification Search ............... 192/48.606–48.611, 85.24–85.46; 475/146
See application file for complete search history.

(56) References Cited

U.S. PATENT DOCUMENTS

| | | | |
|---|---|---|---|
| 6,945,371 B2 | 9/2005 | Schmidt | |
| 7,249,665 B2 * | 7/2007 | Heinrich et al. | 192/48.61 |
| 7,931,556 B2 | 4/2011 | Diosi et al. | |
| 2007/0161450 A1 * | 7/2007 | Onishi et al. | 475/146 |
| 2010/0126819 A1 * | 5/2010 | Goto et al. | 192/66.1 |
| 2010/0170764 A1 * | 7/2010 | Harashima et al. | 192/70.12 |

FOREIGN PATENT DOCUMENTS

| | | |
|---|---|---|
| EP | 1 382 875 B1 | 9/2006 |
| JP | A-2004-53023 | 2/2004 |
| JP | A-2005-320990 | 11/2005 |
| WO | WO 2007/003306 A1 | 1/2007 |

OTHER PUBLICATIONS

Notice of Reasons for Refusal dated Jun. 26, 2012 from Japanese Patent Application No. 2008-312618 (translation only).

* cited by examiner

Primary Examiner — David D Le
Assistant Examiner — Lillian Nguyen
(74) Attorney, Agent, or Firm — Oliff & Berridge, PLC

(57) ABSTRACT

In an embodiment of the present invention, a piston apparatus of an automatic transmission includes a piston member capable of moving in the axial direction of the rotation shaft, and a hydraulic chamber, and has been configured so that the piston member moves in the axial direction due to pressure in the hydraulic chamber. The piston member includes a cylinder part that extends in the axial direction and to which pressure in the hydraulic chamber is transmitted, a pressing part that extends in the radial direction and presses against a friction engaging element of the automatic transmission, and a connecting part that connects the cylinder part and the pressing part and, with respect to the axial direction, is offset from the pressing part in a direction of separation from the friction engaging element. Also, the axial direction offset amount of the connecting part from the pressing part of the piston member has been set larger than the stroke amount of the piston member.

13 Claims, 4 Drawing Sheets

FIG.2

| GEAR STAGE | ENGAGING ELEMENT | | | | | |
|---|---|---|---|---|---|---|
| | C1 | C2 | B1 | B2 | B3 | F1 |
| 1st | ○ | × | × | × | × | ○ |
| 2nd | ○ | × | ○ | × | × | × |
| 3rd | ○ | × | × | × | ○ | × |
| 4th | ○ | ○ | × | × | × | × |
| 5th | × | ○ | × | × | ○ | × |
| 6th | × | ○ | ○ | × | × | × |
| Rev | × | × | × | ○ | ○ | × |

FIG.5
PriorArt
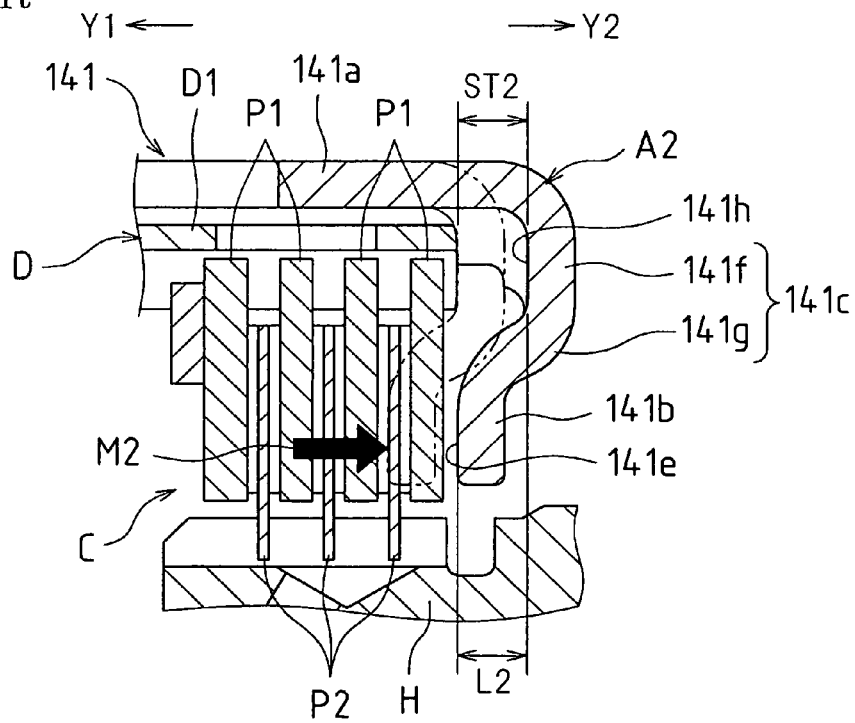

PISTON APPARATUS OF AUTOMATIC TRANSMISSION

BACKGROUND OF THE INVENTION

1. Field of the Invention

The present invention relates to a piston apparatus of an automatic transmission.

2. Description of the Related Art

In a vehicle including an engine (internal combustion engine), an automatic transmission that automatically optimally sets the transmission gear ratio between the engine and a drive wheel is used as a transmission that appropriately transmits torque generated by the engine and rotation speed to the drive wheel in accordance with the running condition of the vehicle. One example of such an automatic transmission is a multi-stage automatic transmission that sets the transmission gear ratio (gear ratio) with use of a friction engaging element such as a clutch or brake, and a planetary gear apparatus.

Such an automatic transmission is provided with a hydraulically actuated piston apparatus in order to engage and release the friction engaging element such as a clutch or brake. Conventionally, a so-called push-type piston apparatus has been used as such a piston apparatus, but in recent years, so-called pull-type piston apparatuses have been used in order to reduce the size of the automatic transmission. As disclosed in, for example, JP 2005-320990A, a pull-type piston apparatus includes a cylindrical piston member (actuating member) that can move in the axial direction of the rotation shaft of an automatic transmission, and a hydraulic chamber. The pull-type piston apparatus is configured so that the piston member is moved in the axial direction by controlling hydraulic fluid (ATF: Automatic Transmission Fluid) supplied to the hydraulic chamber. With such a pull-type piston apparatus, when engaging the friction engaging element, pressure in the hydraulic chamber is transmitted to the piston member, and thus the piston member moves as if it were being pulled to one side in the axial direction. Then, the friction engaging element is pressed by a pressing member that is provided integrally to the piston member. In this case, the hydraulic chamber and the pressing member are disposed on opposite sides of the friction engaging element in the axial direction, thus sandwiching the friction engaging element.

However, with the piston apparatus disclosed in JP 2005-320990A, the pressing member that presses the friction engaging element is a separate member from the piston member. For this reason, there has been the problem of a large number of parts. Also, there has been the problem that it has been necessary to fix the pressing member to the piston member with use of a snap ring or the like.

For this reason, for example, a piston apparatus in which the pressing part that presses the friction engaging element is formed integrally with the piston member, as shown in FIG. 5, has also been used. The following is a specific description of the piston apparatus shown in FIG. 5. FIG. 5 shows part of a piston apparatus for a clutch of a conventional automatic transmission. This piston apparatus includes a piston member (actuating member) 141 that can move in the axial direction due to pressure in a hydraulic chamber not shown in FIG. 5.

Firstly, as shown in FIG. 5, a clutch C used as the friction engaging element is constituted by multiple outer clutch plates P1 and multiple inner clutch plates P2 disposed between the outer clutch plates P1. The outer clutch plates P1 are spline-fitted into the inner circumferential face of a cylinder part D1 of a clutch drum D. The inner clutch plates P2 are spline-fitted into the outer circumferential face of a clutch hub H.

The piston member 141 includes a cylinder part 141a that extends in the axial direction and to which pressure in the above-described hydraulic chamber is transmitted, a pressing part 141b that extends in the radial direction and presses the clutch C, and a connecting part 141c that connects the cylinder part 141a and the pressing part 141b. A face 141e of the pressing part 141b on the clutch C side is a pressing face that presses against an outer clutch plate P1 of the clutch C. The connecting part 141c is constituted by a first portion 141f that extends inward in the radial direction (toward the center of rotation) from an end of the cylinder part 141a, and a second portion 141g that extends so as to join the inner circumferential edge of the first portion 141f and the outer circumferential edge of the pressing part 141b. Also, in order to prevent the connecting part 141c of the piston member 141 from interfering with the clutch drum D when engaging the clutch C, the connecting part 141c of the piston member 141 is configured so as to be, with respect to the axial direction, offset from the pressing part 141b in the direction of separation from the clutch C.

With such a piston apparatus in which the pressing part that presses the friction engaging element is formed integrally with the piston member as described above, from the viewpoint of reducing the size of the automatic transmission, the axial direction offset amount (L2 in FIG. 5) of the piston member is set so as to substantially match the piston stroke (ST2 in FIG. 5) of the piston member. In the configuration shown in FIG. 5, the offset amount L2 is an axial direction offset amount of the connecting part 141c with respect to the pressing part 141b of the piston member 141. Specifically, the offset amount L2 is the axial direction distance between the pressing face 141e of the pressing part 141b and a wall face 141h of the first portion 141f of the connecting part 141c that is on the clutch C side. The piston stroke ST2 is the axial direction distance that the piston member 141 can move between the released state and engaged state of the clutch C. Note that in FIG. 5, the position of the piston member 141 when the clutch C is in the released state is indicated by solid lines, and the position of the piston member 141 when the clutch C is in the engaged state is indicated by dashed double-dotted lines.

However, there are the following points of concern with configurations such as the configuration shown in FIG. 5. Specifically, in the automatic transmission, when engaging the clutch C, the piston member 141 strokes to one side in the axial direction (in the Y1 direction in FIG. 5) when pressure in the hydraulic chamber is transmitted to the cylinder part 141a. Accordingly, the pressing part 141b of the piston member 141 presses an outer clutch plate P1 of the clutch C. At this time, a load (bending moment) M2 directed toward the other side in the axial direction (in the Y2 direction in FIG. 5) acts on the pressing part 141b of the piston member 141. In this case, stress becomes focused on a bending portion A2 that connects the cylinder part 141a and connecting part 141c of the piston member 141, thus causing a problem with the durability of the bending portion A2.

SUMMARY OF THE INVENTION

The present invention has been achieved in view of such problems, and an object thereof is to provide a piston apparatus of an automatic transmission that, with a simple configuration, can reduce stress that acts on a bending portion connecting a cylinder part and connecting part of a piston member when engaging a friction engaging element.

The present invention is configured as described below in order to address the problems described above. Specifically, one aspect of the present invention is a piston apparatus of an automatic transmission including a cylindrical actuating member capable of moving in an axial direction of a rotation shaft of the automatic transmission, and a hydraulic chamber, and configured so that the actuating member moves in the axial direction due to pressure in the hydraulic chamber, the actuating member including a cylinder part that extends in the axial direction and to which pressure in the hydraulic chamber is transmitted, a pressing part that extends in a radial direction and presses against a friction engaging element of the automatic transmission, and a connecting part that connects the cylinder part and the pressing part and, with respect to the axial direction, is offset from the pressing part in a direction of separation from the friction engaging element, and an axial direction offset amount of the connecting part from the pressing part being set larger than a stroke amount of the actuating member. More specifically, the friction engaging element may be a clutch included in the automatic transmission.

According to this configuration, with a simple structure in which the offset amount is set larger than the stroke amount, it is possible to reduce the stress that acts on the portion (bending portion) connecting the cylinder part and connecting part of the actuating member when engaging the friction engaging element, thus enabling improving the durability of the actuating member.

More specifically, when the piston apparatus having the above configuration is applied to the clutch of an automatic transmission, the stress that acts on the bending portion connecting the cylinder part and connecting part of the actuating member when engaging the clutch is reduced. Accordingly, with a simple structure in which the offset amount is set larger than the stroke amount, it is possible to increase the rigidity of the bending portion of the actuating member, thus enabling improving the durability of the actuating member. In this case, the durability of the actuating member can be improved without increasing the thickness of the actuating member or using an expensive high-strength material as the material of the actuating member, thus enabling a reduction in cost.

In the present invention, it is preferable that the connecting part is constituted by a first portion that extends inward in the radial direction from an end part of the cylinder part and has been provided substantially parallel to the pressing part, and a second portion that extends so as to join an inner circumferential edge of the first portion and an outer circumferential edge of the pressing part and has been provided so as to be tilted with respect to the pressing part.

In the present invention, it is preferable that the offset amount has been set to a value such that the section modulus of the actuating member is greater than a case in which the offset amount has been set to the same value as the stroke amount. More specifically, it is preferable that the actuating member has been formed such that, in a cross-sectional view, the shape of a rectangular area that encompasses the pressing part and the connecting part is longer in the axial direction than the case in which the offset amount has been set to the same value as the stroke amount.

The stress that acts on the bending portion connecting the cylinder part and connecting part of the actuating member when engaging the clutch is equal to the bending moment that acts on the pressing part of the actuating member divided by the section modulus of the actuating member, and therefore increasing the section modulus of the actuating member is effective in reducing the stress that acts on the bending portion. In view of this, in the above configuration, the offset amount of the actuating member has been set to a value such that the section modulus of the actuating member is greater than the case in which the offset amount has been set to the same value as the stroke amount.

In the present invention, it is preferable that the offset amount has been set according to a material of the actuating member.

In this case, a reduction in cost can be achieved by using a relatively inexpensive general material as the material of the actuating member. On the other hand, using a high-strength material whose tensile strength is relatively high as the material of the actuating member enables suppressing the offset amount to a small amount, thus enabling reducing the size of the automatic transmission.

BRIEF DESCRIPTION OF THE DRAWINGS

FIG. 2 is an actuating table showing actuating in the automatic transmission shown in FIG. 1.

FIG. 5 is a diagram corresponding to FIG. 4 that shows part of a piston apparatus of a conventional automatic transmission.

DESCRIPTION OF THE PREFERRED EMBODIMENTS

Below is a description of an embodiment of the present invention with reference to the attached drawings.

Figure 1:
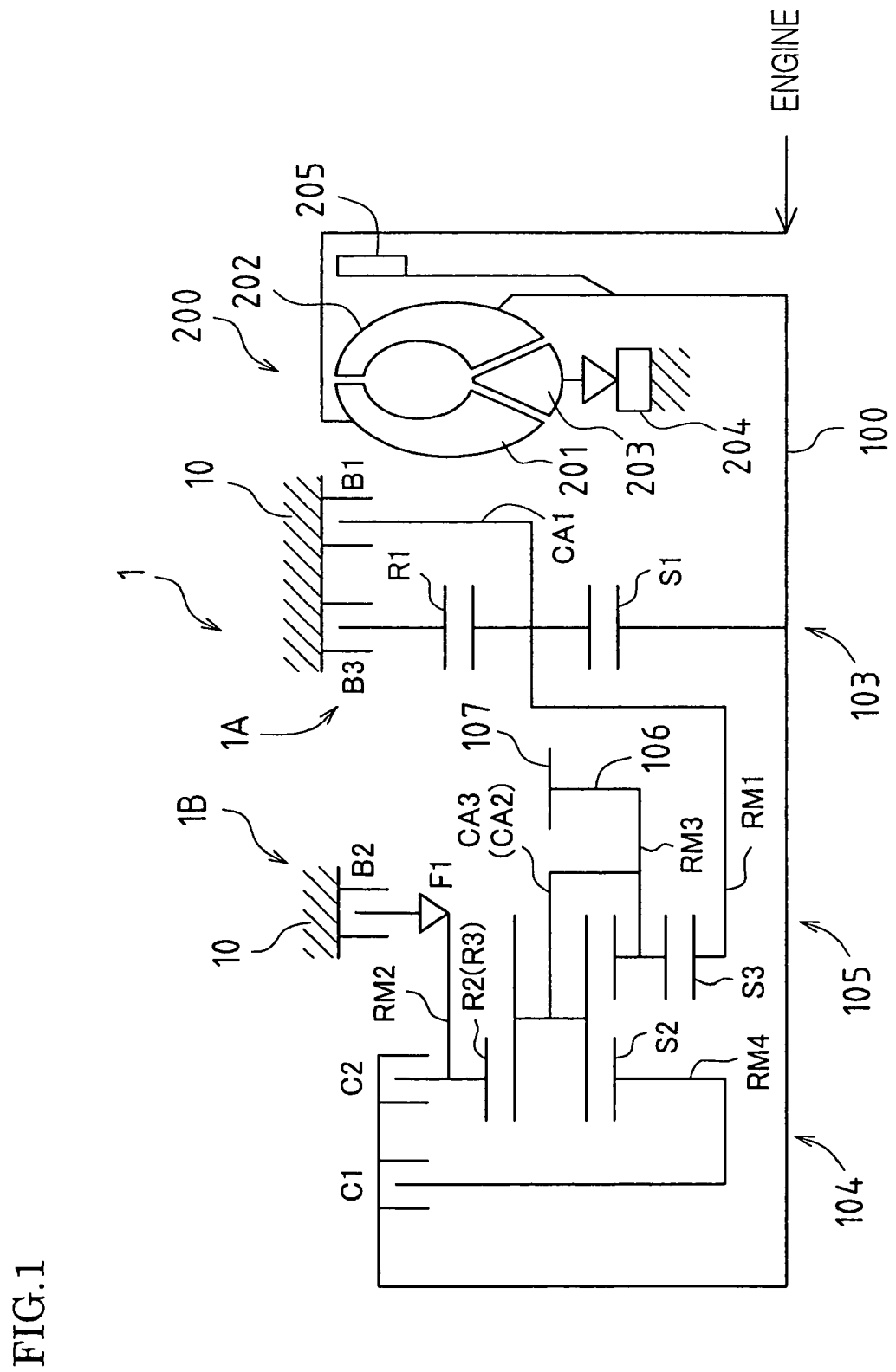
FIG. 1 is a schematic diagram showing an automatic transmission according to an embodiment to which a piston apparatus of the present invention is applied.

FIG. 1 is a schematic diagram showing an automatic transmission (including a torque converter) according to an embodiment to which a piston apparatus of the present invention is applied.

FIG. 1 shows an automatic transmission 1 included in an FF (Front-engine, Front-wheel drive) vehicle. Note that since the automatic transmission 1 is configured substantially symmetrically with respect to a center line, the lower half below the center line has been omitted in FIG. 1.

Firstly, a torque converter 200 is a fluid transmission apparatus that performs power transmission between an input shaft side and an output shaft side via a fluid. The torque converter 200 includes a pump impeller 201 on the input shaft side, a turbine runner 202 on the output shaft side, a stator 203 that realizes a torque amplification function, and a one-way clutch 204.

The torque converter 200 is provided with a lock-up clutch 205 that causes the input shaft side and the output shaft side to be in a directly-connected state. The lock-up clutch 205 is engaged and released by controlling the engaging pressure applied thereto. Causing the lock-up clutch 205 to be completely engaged causes the pump impeller 201 and the turbine runner 202 to rotate integrally. Also, causing the lock-up clutch 205 to be engaged in a predetermined slip state (half-engaged state) causes the turbine runner 202 to rotate slower than the pump impeller 201 by a predetermined slip amount during driving.

The automatic transmission 1 includes a first transmission part 1A whose main constituent element is a single-pinion first planetary gear apparatus 103, and a second transmission part 1B whose main constituent elements are a single-pinion second planetary gear apparatus 104 and a double-pinion third planetary gear apparatus 105. The first transmission part 1A and the second transmission part 1B are disposed coaxially. In this way, the automatic transmission 1 is configured as a planetary gear multi-stage transmission. In the automatic transmission 1, the speed of rotation input to an input shaft 100 is changed and transmitted to an output shaft 106, and then output from an output gear 107. The output gear 107 is connected to a differential gear apparatus included in the vehicle, either directly or via a counter shaft.

The first planetary gear apparatus 103 that constitutes the first transmission part 1A includes three rotation elements, namely a sun gear S1, a carrier CA1, and a ring gear R1. The sun gear S1 is connected to the input shaft 100. Also, as a result of the ring gear R1 being fixed to a housing case 10 via a third brake B3, with the carrier CA1 being an intermediate output member, the sun gear S1 rotates at a reduced speed with respect to the input shaft 100.

Four rotation elements RM1 to RM4 are constituted by partial interconnection of the second planetary gear apparatus 104 and the third planetary gear apparatus 105 that constitute the second transmission part 1B. Specifically, the first rotation element RM1 is constituted by a sun gear S3 of the third planetary gear apparatus 105. A ring gear R2 of the second planetary gear apparatus 104 and a ring gear R3 of the third planetary gear apparatus 105 are connected with each other, and the second rotation element RM2 is constituted by the ring gear R2 and the ring gear R3. Furthermore, a carrier CA2 of the second planetary gear apparatus 104 and a carrier CA3 of the third planetary gear apparatus 105 are connected with each other, and the third rotation element RM3 is constituted by the carrier CA2 and the carrier CA3. Also, the fourth rotation element RM4 is constituted by a sun gear S2 of the second planetary gear apparatus 104.

In this embodiment, the second planetary gear apparatus 104 and the third planetary gear apparatus 105 are considered to be Ravigneaux planetary gear trains. The carrier CA2 and the carrier CA3 are constituted by common members, and the ring gear R2 and the ringer gear R3 are also constituted by common members. Furthermore, a pinion gear of the second planetary gear apparatus 104 also functions as a second pinion gear of the third planetary gear apparatus 105.

The first rotation element RM1 (sun gear S3) is connected integrally with the carrier CA1 of the first planetary gear apparatus 103 that is the intermediate output member, and the rotation of the first rotation element RM1 is stopped by selectively being connected with the housing case 10 by a first brake B1. The second rotation element RM2 (ring gear R2 and ring gear R3) are selectively connected with the input shaft 100 via a second clutch C2. Also, the rotation of the second rotation element RM2 is stopped by selectively being connected with the housing case 10 via a one-way clutch F1 and a second brake B2.

The third rotation element RM3 (carrier CA2 and carrier CA3) is connected integrally with the output shaft 106. The fourth rotation element RM4 (sun gear S2) is selectively connected with the input shaft 100 via a first clutch C1.

In the automatic transmission 1 configured as described above, a shift stage is set as a result of the first clutch C1, the second clutch C2, the first brake B1, the second brake B2, the third brake B3, and the one-way clutch F1, which are friction engaging elements, being released or engaged in a predetermined state.

FIG. 2 is an engaging table (actuating table) for describing actuating of the clutches and brakes in order to achieve various shift stages of the automatic transmission 1. In FIG. 2, a circle indicates an engaged state, and an X indicates a released state.

As shown in FIG. 2, in the automatic transmission 1, when the first clutch C1 is engaged, "1st" of the forward stage is achieved, and the one-way clutch F1 is engaged in 1st. Also, when the first clutch C1 and the first brake B1 are engaged, "2nd" of the forward stage is achieved. When the first clutch C1 and the third brake B3 are engaged, "3rd" of the forward stage is achieved. When the first clutch C1 and the second clutch C2 are engaged, "4th" of the forward stage is achieved. When the second clutch C2 and the third brake B3 are engaged, "5th" of the forward stage is achieved. Furthermore, when the second clutch C2 and the first brake B1 are engaged, "6th" of the forward stage is achieved.

Also, in the automatic transmission 1, when the second brake B2 and the third brake B3 are engaged, the reverse stage (Rev) is achieved.

Next is a description of a specific structure of the automatic transmission 1.

Figure 3:
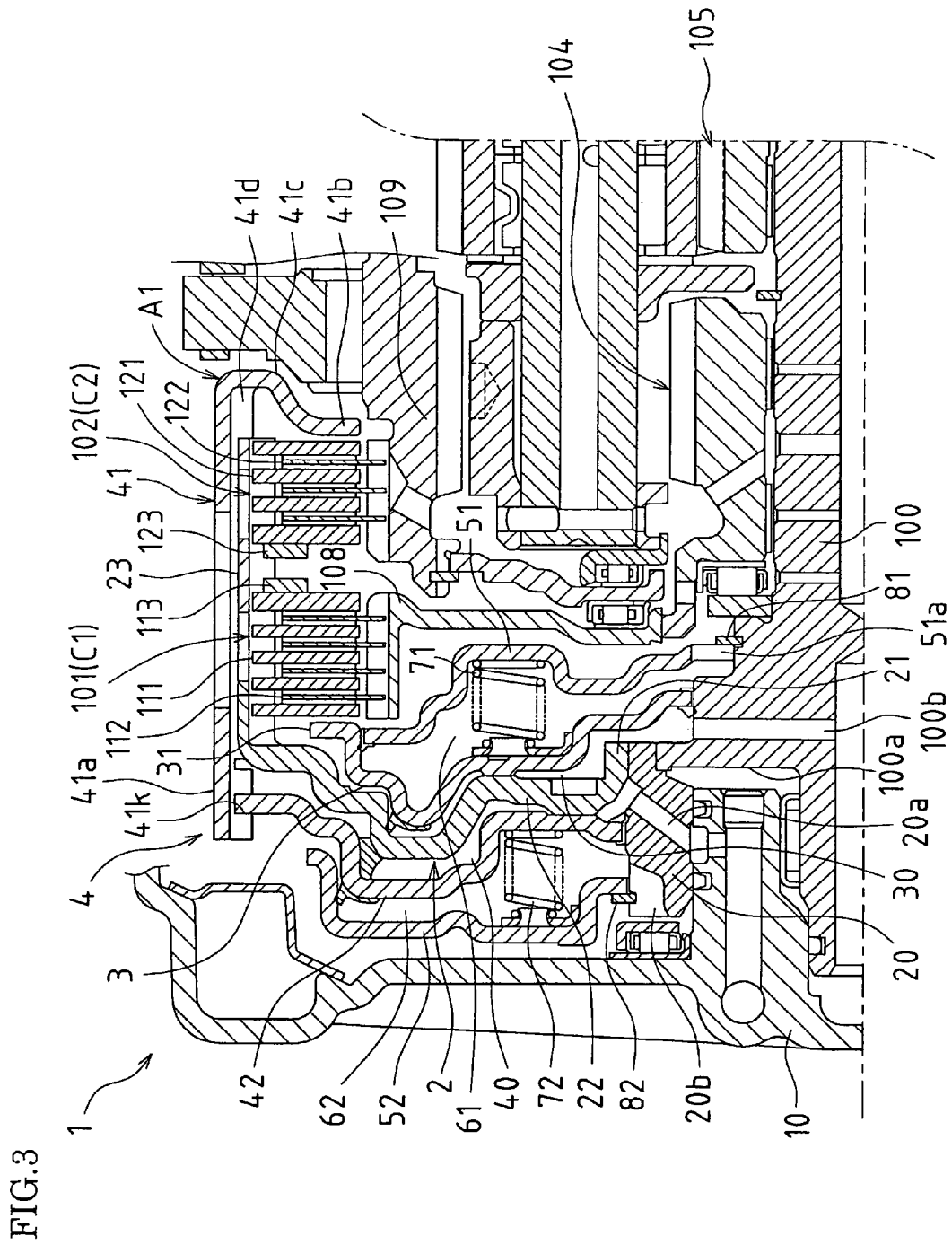
FIG. 3 is a cross-sectional diagram showing part of the automatic transmission shown in FIG. 1.
Figure 4:
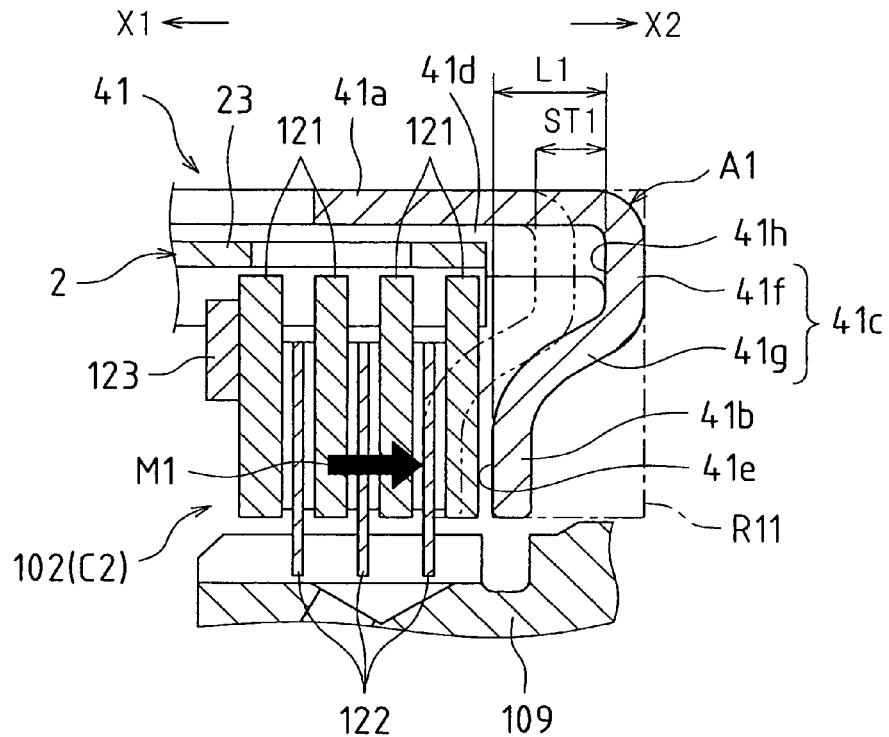
FIG. 4 is an enlarged view of a relevant part of FIG. 3.

FIG. 3 is a cross-sectional diagram showing part of the second transmission part 1B of the automatic transmission 1. FIG. 4 is an enlarged view of a relevant part of FIG. 3. Note that since the automatic transmission 1 is configured substantially symmetrically with respect to the center line, the lower half below the center line has been omitted in FIG. 3.

As shown in FIGS. 3 and 4, the automatic transmission 1 includes the input shaft 100 that is supported so as to be capable of relative rotation with respect to the housing case 10 via a bearing, the single-pinion second planetary gear apparatus 104, the double-pinion third planetary gear apparatus 105, the first clutch C1, the second clutch C2, a clutch drum 2, a first piston 3, a second piston 4, and the like.

The input shaft 100 has a flange 100a formed thereon that extends perpendicularly with respect to the shaft center. An annular base member 20 is disposed on the outer circumferential edge of the flange 100a. The base member 20 is supported so as to be capable of relative rotation with respect to the housing case 10.

The clutch drum 2 is constituted by a hub part 21 mounted externally on the base member 20, an annular side wall 22 extending in the radial direction from the hub part 21, and a substantially cylindrical cylinder part 23 extending in the axial direction from the outer circumferential edge of the side wall 22. The hub part 21 of the clutch drum 2 is fixed to the base member 20 by welding or the like. Also, the base member 20 is fixed to the flange 100a of the input shaft 100 by welding or the like. The clutch drum 2 therefore rotates integrally with the input shaft 100.

A first friction engaging element 101 that is the constituent member of the first clutch C1, and a second friction engaging element 102 that is the constituent member of the second clutch C2 are disposed inside the cylinder part 23 of the clutch drum 2.

The first friction engaging element 101 is constituted by multiple outer clutch plates (friction plates) 111, and multiple inner clutch plates (friction plates) 112 that are disposed between the outer clutch plates 111.

The outer clutch plates 111 that constitute the first friction engaging element 101 are spline-fitted into the inner circumferential face of the cylinder part 23 of the clutch drum 2. The inner clutch plates 112 are spline-fitted into the outer circumferential face of a first clutch hub 108. The movement of the first friction engaging element 101 toward the second friction engaging element 102 (movement in the axial direction) is restricted by a snap ring 113 fixed to the cylinder part 23 of the clutch drum 2.

Likewise, the second friction engaging element 102 is constituted by multiple outer clutch plates (friction plates) 121 and multiple inner clutch plates (friction plates) 122 that are disposed between the outer clutch plates 121.

The outer clutch plates 121 that constitute the second friction engaging element 102 are spline-fitted into the inner circumferential face of the cylinder part 23 of the clutch drum 2. The inner clutch plates 122 are spline-fitted into the outer circumferential face of a second clutch hub 109. The movement of the second friction engaging element 102 toward the first friction engaging element 101 (movement in the axial direction) is restricted by a snap ring 123 fixed to the cylinder part 23 of the clutch drum 2.

The first piston 3 is disposed on the front face side (first clutch C1 side) of the clutch drum 2. The first piston 3 is fitted so as to be freely slidable in the axial direction with respect to the input shaft 100. The first piston 3 is a substantially disk-shaped member, and a pressing part 31 is formed integrally on the outer circumferential edge of the first piston 3. The first piston 3 rotates integrally with the clutch drum 2.

A first hydraulic chamber 30 is formed between the first piston 3 and the side wall 22 of the clutch drum 2. When ATF (hydraulic fluid) is supplied to the first hydraulic chamber 30 from a fluid hole 100*b* formed in the input shaft 100, the first piston 3 moves in the direction of separation from the side wall 22 of the clutch drum 2 (toward the first friction engaging element 101), and the pressing part 31 of the first piston 3 presses against the first friction engaging element 101. As a result of the first friction engaging element 101 being pressed in this way, the outer clutch plates 111 and inner clutch plates 112 that constitute the first friction engaging element 101 become engaged with each other (engagement of the first clutch C1).

Conversely, when the ATF in the first hydraulic chamber 30 flows out through the fluid hole 100*b*, the first piston 3 moves in a direction of approaching the side wall 22 of the clutch drum 2, and the pressing of the pressing part 31 of the first piston 3 against the first friction engaging element 101 is released. As a result of the pressing against the first friction engaging element 101 being released, the engagement of the outer clutch plates 111 and inner clutch plates 112 that constitute the first friction engaging element 101 is released (release of the first clutch C1). In other words, the first clutch C1 is engaged and released by the movement of the first piston 3 in the axial direction due to pressure in the first hydraulic chamber 30.

An annular balancer 51 is disposed on the front face side (first clutch C1 side) of the first piston 3. The balancer 51 is fitted externally to the input shaft 100, and the movement of the balancer 51 in the direction of separation from the first piston 3 is restricted by a snap ring 81 fixed to the input shaft 100. A return spring (compressing coil spring) 71 is disposed between the balancer 51 and the first piston 3. Due to the elastic force of the return spring 71, the first piston 3 is biased in the direction of separation from the balancer 51 (toward the clutch drum 2). Also, a cancel chamber (hydraulic chamber) 61 that cancels centrifugal hydraulic pressure in the first hydraulic chamber 30 of the first piston 3 is disposed between the balancer 51 and the first piston 3. The cancel chamber 61 communicates with the space at the front face side of the balancer 51 through a cutout 51*a* formed in the inner circumferential part of the balancer 51.

The second piston 4 is disposed on the back face side (side opposite from the first piston 3) of the clutch drum 2. The second piston 4 is fitted so as to be freely slidable in the axial direction with respect to the base member 20. The second piston 4 rotates integrally with the clutch drum 2.

The second piston 4 is constituted by a substantially cylindrical piston member (actuating member) 41 that covers the outer circumferential part of the clutch drum 2, and an annular side wall 42 provided at one end (in FIG. 3, the left end) of a cylinder part 41*a* of the piston member 41. The side wall 42 is fitted in a groove part 41*k* formed at one end of the cylinder part 41*a* of the piston member 41, and the movement of the side wall 42 in the axial direction with respect to the cylinder part 41*a* is restricted. A pressing part 41*b* that projects inward (toward the center of rotation) is provided integrally at the other end (in FIGS. 3 and 4, the right end) of the cylinder part 41*a* of the piston member 41, via a connecting part 41*c*.

A second hydraulic chamber 40 is formed between the side wall 42 of the second piston 4 and the side wall 22 of the clutch drum 2. When ATF (hydraulic fluid) is supplied to the second hydraulic chamber 40 from a fluid hole 20*a* formed in the base member 20, hydraulic pressure in the second hydraulic chamber 40 is transmitted to the second piston 4, and the side wall 42 of the second piston 4 moves in the direction of separation from the side wall 22 of the clutch drum 2. Accordingly, the piston member 41 moves in the same direction, and the pressing part 41*b* of the second piston 4 presses against the second friction engaging element 102. As a result of the second friction engaging element 102 being pressed, the outer clutch plates 121 and inner clutch plates 122 that constitute the second friction engaging element 102 become engaged with each other (engagement of the second clutch C2).

Conversely, when the ATF in the second hydraulic chamber 40 flows out through the fluid hole 20*a*, the side wall 42 of the second piston 4 moves in the direction of approaching the side wall 22 of the clutch drum 2. Accordingly, the piston member 41 moves in the same direction, and the pressing of the pressing part 41*b* of the second piston 4 against the second friction engaging element 102 is released. As a result of the pressing against the second friction engaging element 102 being released, the engagement of the outer clutch plates 121 and inner clutch plates 122 that constitute the second friction engaging element 102 is released (release of the second clutch C2). In other words, the second clutch C2 is engaged and released by the movement of the second piston 4 in the axial direction due to pressure in the second hydraulic chamber 40.

An annular balancer 52 is disposed on the back face side (side opposite from the second hydraulic chamber 40) of the second piston 4. The balancer 52 is fitted externally to the base member 20, and the movement of the balancer 52 in the direction of separation from the second piston 4 is restricted by a snap ring 82 fixed to the base member 20. A return spring (compressing coil spring) 72 is disposed between the balancer 52 and the side wall 42 of the second piston 4. Due to the elastic force of the return spring 72, the second piston 4 is biased in the direction of separation from the balancer 52 (toward the clutch drum 2). Also, a cancel chamber (hydraulic chamber) 62 that cancels centrifugal hydraulic pressure in the second hydraulic chamber 40 of the second piston 4 is formed between the balancer 52 and the side wall 42 of the second piston 4. The cancel chamber 62 communicates with the space at the back face side of the balancer 52 through multiple grooves 20*b* formed on the outer circumference of the base member 20.

In the present embodiment, a so-called pull-type piston apparatus is configured due to the second piston 4 and the second hydraulic chamber 40. Specifically, when engaging the second clutch C2, pressure in the second hydraulic chamber 40 is transmitted to the piston member 41, and thus the piston member 41 moves as if being pulled to one side (in the X1 direction in FIG. 4) in the axial direction. Then, the second friction engaging element 102 is pressed by the pressing part 41b provided on the piston member 41. In this case, the second hydraulic chamber 40 and the pressing part 41b are disposed on opposite sides of the second friction engaging element 102 in the axial direction, so as to sandwich the second friction engaging element 102.

Also, a feature of the present embodiment is that, in the pull-type piston apparatus, an axial direction offset amount L1 of the connecting part 41c from the pressing part 41b of the piston member 41 of the second piston 4 is set larger than a piston stroke ST1 of the piston member 41. The following describes this feature with reference to FIGS. 3 and 4.

As shown in FIGS. 3 and 4, the piston member 41 of the second piston 4 includes the cylinder part 41a that extends in the axial direction and to which pressure in the second hydraulic chamber 40 is transmitted, the pressing part 41b that extends in the radial direction and presses against the second friction engaging element 102, and the connecting part 41c that connects the cylinder part 41a and the pressing part 41b. The piston member 41 is configured so that the cylinder part 41a and the pressing part 41b are formed integrally via the connecting part 41c. The piston member 41 is formed by, for example, performing press working or the like on a steel plate such as a hot-rolled steel plate (SPH material).

A spline groove 41d is formed in the inner circumferential face of the cylinder part 41a of the piston member 41, and this spline groove 41d fits with a spline tooth formed in the outer circumferential face of the cylinder part 23 of the clutch drum 2. The pressing part 41b is an annular portion provided on the other end side (in the X2 direction in FIG. 4) of the piston member 41. A face 41e of the pressing part 41b on the second friction engaging element 102 side is a pressing face that presses against an outer plate 121 that constitutes the second friction engaging element 102, and is a face that is substantially orthogonal to the axial direction.

The connecting part 41c of the piston member 41 is constituted by a first portion 41f that extends inward in the radial direction (toward the center of rotation) from the other end of the cylinder part 41a, and a second portion 41g that extends so as to join the inner circumferential edge of the first portion 41f and the outer circumferential edge of the pressing part 41b. In this case, the first portion 41f is a substantially annular portion provided substantially parallel to the pressing part 41b. The second portion 41g is a cylindrical portion provided at a tilt with respect to the pressing part 41b, and the cross-sectional configuration of the second portion 41g is such that, the farther outward in the radial direction, the more tilted the configuration is toward the direction of separation from the second friction engaging element 102.

The connecting part 41c of the piston member 41 is, with respect to the axial direction, offset from the pressing part 41b in the direction of separation from the second friction engaging element 102. The connecting part 41c is offset in this way in order to prevent the connecting part 41c of the piston member 41 from interfering with the clutch drum 2 when engaging the second clutch C2.

Also, the axial direction offset amount L1 of the connecting part 41c from the pressing part 41b of the piston member 41 is set larger than the piston stroke ST1 of the piston member 41 (L1>ST1). As shown in FIG. 4, the offset amount L1 is the axial direction distance between the pressing face 41e of the pressing part 41b and a wall face 41h of the first portion 41f of the connecting part 41c that is on the second friction engaging element 102 side. The piston stroke ST1 is the axial direction distance that the piston member 41 can move between the released state and engaged state of the second clutch C2. Note that in FIG. 4, the position of the piston member 41 when the second clutch C2 is in the released state is indicated by solid lines, and the position of the piston member 41 when the second clutch C2 is in the engaged state is indicated by dashed double-dotted lines.

As described above, in the present embodiment, the offset amount L1 is a value larger than the piston stroke ST1, and therefore the section modulus of the piston member 41 is larger than in the conventional configuration (FIG. 5) in which the offset amount L2 and the piston stroke ST2 are substantially the same value. For this reason, there is a reduction in the stress (bending stress) that acts on the bending portion A1 of the piston member 41, or more specifically, the portion that connects the cylinder part 41a and the connecting part 41c, when engaging the second clutch C2. Accordingly, with a simple configuration in which the offset amount L1 is set larger than the piston stroke ST1, it is possible increase the rigidity of the bending portion A1 of the piston member 41, thus improving the durability of the piston member 41. The following is a specific description of this point.

In the automatic transmission 1, when engaging the second clutch C2, the piston member 41 strokes to one side in the axial direction (in the X1 direction in FIG. 4) when pressure in the second hydraulic chamber 40 is transmitted to the cylinder part 41a of the piston member 41. Accordingly, the pressing part 41b of the piston member 41 presses against an outer clutch plate 121 constituting the second friction engaging element 102. In this case, a load (bending moment) M1 directed toward the other side in the axial direction (the X2 direction in FIG. 4) acts on the pressing part 41b of the piston member 41. At this time, stress becomes focused on the bending portion A1 that connects the cylinder part 41a and connecting part 41c of the piston member 41, thus causing a problem with the durability of the bending portion A1.

Here, the stress acting on the bending portion A1 of the piston member 41 when engaging the second clutch C2 is equal to the bending moment M1 divided by the section modulus of the piston member 41, and therefore increasing the section modulus of the piston member 41 is effective in reducing the stress that acts on the bending portion A1. In view of this, in the present embodiment, the end part of the piston member 41 is shaped so that the section modulus of the piston member 41 is large.

Specifically, the section modulus of the piston member 41 is larger as the offset amount L1 increases. For this reason, as the offset amount L1 increases, it is possible to further reduce the stress that acts on the bending portion A1 of the piston member 41 when engaging the second clutch C2. This is due to the fact that in a cross-sectional view, the shape of a rectangular area R11 that surrounds the pressing part 41b and connecting part 41c of the piston member 41 approximates a shape having a relatively long horizontal length in the axial direction instead of a shape having a relatively long vertical length in the radial direction. As shown in FIG. 4, in the axial direction, the rectangular area R11 spans from the pressing face 41e of the pressing part 41b to the other end (in FIG. 4, the right end) of the connecting part 41c, and in the radial direction, the rectangular area R11 spans from the inner circumferential end of the pressing part 41b to the outer circumferential face of the cylinder part 41a.

As shown in FIG. 5, in the conventional configuration, it is possible to ensure only the offset amount L2 that substantially matches the piston stroke ST2 (L2≈ST2). However, in the present embodiment, the offset amount L1 that surpasses the piston stroke ST1 (L1>ST1) is ensured as shown in FIG. 4. Accordingly, the present embodiment enables reducing the stress that acts on the bending portion A1 of the piston member 41 when engaging the second clutch C2 so as to be lower than in the conventional configuration, thus improving the durability of the piston member 41. In this case, the durability of the piston member 41 can be improved without increasing the thickness of the piston member 41 or using an expensive high-strength material as the material of the piston member 41, thus enabling a reduction in cost.

Here, from the viewpoint of reducing the size of the automatic transmission 1, it is preferable to set the offset amount L1 to the minimum value required to reduce the stress that acts on the bending portion A1 of the piston member 41. Accordingly, it is preferable to set the offset amount L1 according to the material of the piston member 41.

In this case, using a relatively inexpensive general material as the material of the piston member 41 enables a reduction in cost. Examples of relatively inexpensive general materials include SPH440 and SPC440 materials whose tensile strength is approximately 440 MPa, and SPH270 and SPC270 materials whose tensile strength is approximately 270 MPa. Note that other steel plates and the like may be used as the general material.

On the other hand, using a high-strength material whose tensile strength is relatively high as the material of the piston member 41 enables suppressing the offset amount L1 to a small amount, thus enabling reducing the size of the automatic transmission 1. Examples of high-strength materials whose tensile strength is relatively high include SPH590 and SPC590 materials whose tensile strength is approximately 590 MPa, and SPH780 and SPC780 materials whose tensile strength is approximately 780 MPa. Note that other steel plates and the like may be used as the high-strength material.

Other Embodiments

The embodiment of the present invention described above is merely one example, and various modifications are possible.

Although the example of applying the present invention to a piston apparatus for engaging and releasing the second clutch C2 is described in the above embodiment, the present invention is not limited to this. The present invention can also be applied to any so-called pull-type piston apparatus for engaging and releasing a friction engaging element. For example, the present invention can also be applied to a piston apparatus for engaging and releasing a brake included in an automatic transmission.

Also, although the example in which the present invention is applied to a piston apparatus in a six-forward speed automatic transmission has been described, the present invention is not limited to this. The present invention can be applied to a piston apparatus in a planetary gear automatic transmission having an arbitrary number of shift stages.

Also, the present invention is not limited to a piston apparatus in an automatic transmission included in an FF (Front-engine, Front-wheel drive) vehicle. The present invention can also be applied to a piston apparatus in an automatic transmission included in an FR (Front-engine, Real-wheel drive) vehicle or four-wheel drive vehicle.

The present invention can be implemented in various other forms without departing from the spirit or major characteristics of the present invention. The embodiments described above are therefore nothing more than examples in every respect, and should not be interpreted in a limiting way. The scope of the present invention is defined in the scope of the claims, and should not be restricted to the body of the description in any way. Furthermore, all variations and modifications within a scope equivalent to the scope of the claims are encompassed in the scope of the present invention.

This application claims priority rights based on JP 2008-312618A filed in Japan on Dec. 8, 2008. The entire content of this prior application is hereby incorporated by reference in the present application. Also, the entire content of the document cited in the present description is hereby specifically incorporated herein by reference.

What is claimed is:

1. A piston apparatus of an automatic transmission including a cylindrical actuating member capable of moving in an axial direction of a rotation shaft of the automatic transmission, and a hydraulic chamber, and configured so that the actuating member moves in the axial direction due to pressure in the hydraulic chamber, the actuating member including a cylinder part that extends in the axial direction and to which pressure in the hydraulic chamber is transmitted, a pressing part that extends in a radial direction and presses against a friction engaging element of the automatic transmission, and a connecting part that connects the cylinder part and the pressing part and, with respect to the axial direction, is offset from the pressing part in a direction of separation from the friction engaging element, and an axial direction offset amount of the connecting part from the pressing part being set larger than a stroke amount of the actuating member, wherein the stroke amount of the actuating member is an axial direction distance that the actuating member can move between a released state and an engaged state of the friction engaging element.

2. The piston apparatus of the automatic transmission according to claim 1, wherein the connecting part is constituted by a first portion that extends inward in the radial direction from an end part of the cylinder part and has been provided substantially parallel to the pressing part, and a second portion that extends so as to join an inner circumferential edge of the first portion and an outer circumferential edge of the pressing part and has been provided so as to be tilted with respect to the pressing part.

3. The piston apparatus of the automatic transmission according to claim 2, wherein the offset amount has been set according to a material of the actuating member.

4. The piston apparatus of the automatic transmission according to claim 2, wherein the offset amount has been set to a value such that the section modulus of the actuating member is greater than a case in which the offset amount has been set to the same value as the stroke amount.

5. The piston apparatus of the automatic transmission according to claim 4, wherein the actuating member has been formed such that, in a cross-sectional view, a shape of a rectangular area that encompasses the pressing part and the connecting part is longer in the axial direction than the case in which the offset amount has been set to the same value as the stroke amount.

6. The piston apparatus of the automatic transmission according to claim 4, wherein the offset amount has been set according to a material of the actuating member.

7. The piston apparatus of the automatic transmission according to claim 5, wherein the offset amount has been set according to a material of the actuating member.

8. The piston apparatus of the automatic transmission according to claim 1, wherein the offset amount has been set to a value such that a section modulus of the actuating member is greater than a case in which the offset amount has been set to the same value as the stroke amount.

9. The piston apparatus of the automatic transmission according to claim 8,
wherein the actuating member has been formed such that, in a cross-sectional view, a shape of a rectangular area that encompasses the pressing part and the connecting part is longer in the axial direction than the case in which the offset amount has been set to the same value as the stroke amount.

10. The piston apparatus of the automatic transmission according to claim 8,
wherein the offset amount has been set according to a material of the actuating member.

11. The piston apparatus of the automatic transmission according to claim 9,
wherein the offset amount has been set according to a material of the actuating member.

12. The piston apparatus of the automatic transmission according to claim 1,
wherein the offset amount has been set according to a material of the actuating member.

13. The piston apparatus of the automatic transmission according to claim 1,
wherein the friction engaging element is a clutch included in the automatic transmission.

* * * * *